Oct. 14, 1969     R. C. HUGHES ET AL     3,472,594
MULTI-CHANNEL ATOMIC ABSORPTION SPECTROMETER
Filed June 6, 1966
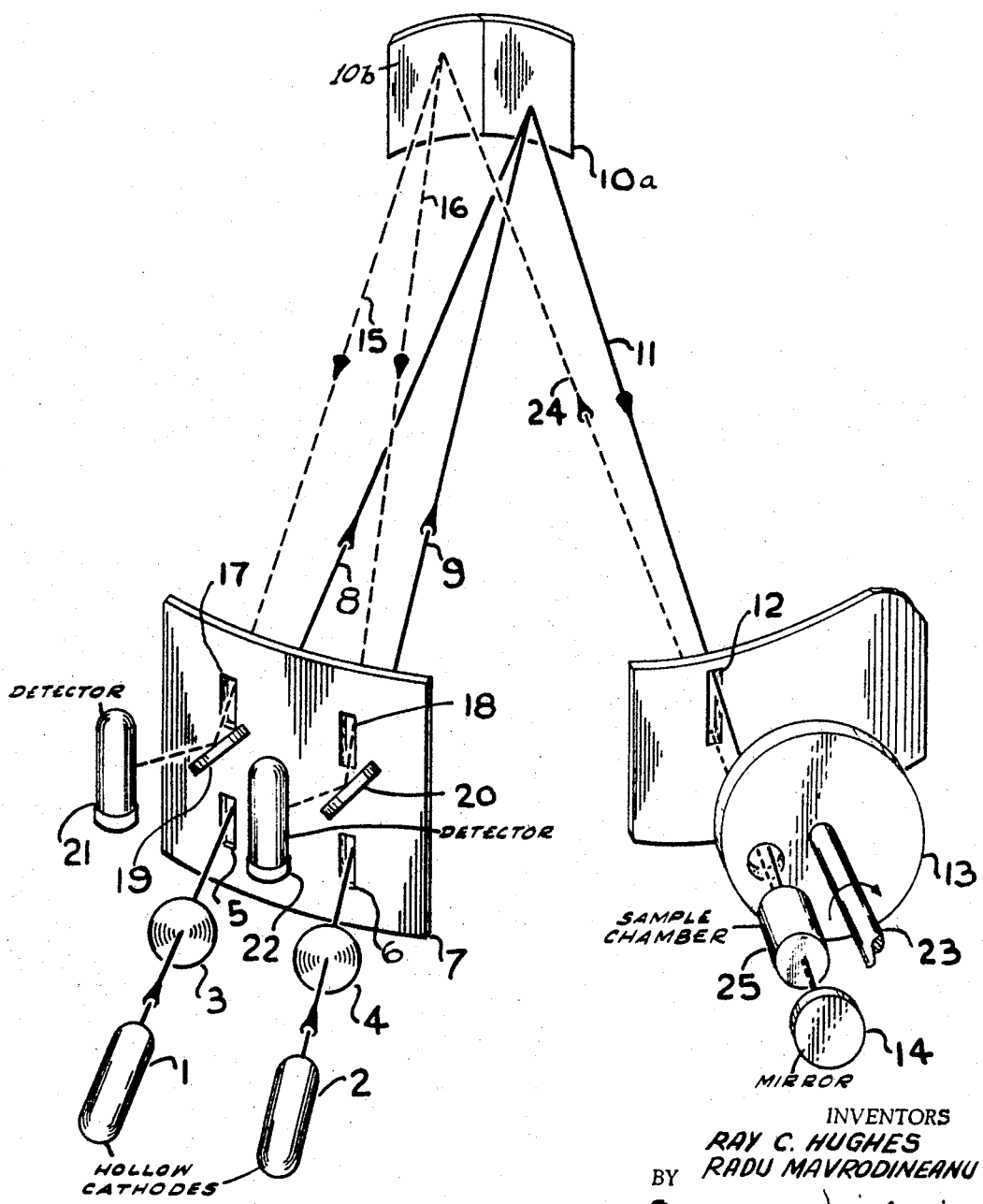
INVENTORS
RAY C. HUGHES
RADU MAVRODINEANU
BY
Frank R. Trifari
AGENT

United States Patent Office 3,472,594
Patented Oct. 14, 1969

3,472,594
MULTI-CHANNEL ATOMIC ABSORPTION SPECTROMETER
Ray C. Hughes and Radu Mavrodineanu, Ossining, N.Y., assignors, by mesne assignments, to U.S. Philips Corporation, New York, N.Y., a corporation of Delaware
Filed June 6, 1966, Ser. No. 555,472
Int. Cl. G01j 3/42; G01n 21/22
U.S. Cl. 356—93                                                                 5 Claims

ABSTRACT OF THE DISCLOSURE

A multi-channel atomic absorption spectrometer for simultaneously determining the presence of two or more elements in a sample employing at least two radiation sources each producing a different wavelength corresponding to an absorption line of one of said elements, dispersing elements, e.g., prisms or diffraction gratings for combining the beams from the respective sources into a common beam which is transmitted through the sample and for splitting the common beam into separate beams each corresponding to an absorption line of one of said elements and detectors for detecting the radiation in each of the separate beams.

---

The invention relates to a multi-channel absorption spectrometer for simultaneously determining the presence of two or more elements by atomic absorption.

The analytical determination of one element at a time by the method of atomic absorption spectroscopy is well-known. For this measurement, radiation identical in frequency to that of the resonance radiation of the element the presence of which is to be detected is passed through a hot vapor of an analytical sample containing the element in the form of atomic vapor; the impinging radiation, in passing through the vaporized sample, is more or less absorbed depending upon the concentration of the element in the sample. Measurements of the incident and transmitted radiation permit a quantitative determination of the concentration of the element from the absorption equation:

$$I = I_0 e^{-kcl}$$

in which $I_0$ is the intensity of the incident radiation, $I$ the intensity of the transmitted radiation, $k$ is the extinction coefficient or a factor expressing the inherent absorbing strength of the element, $c$ is the concentration of the element, and $l$ is the path length in the absorbing vapor traversed by the radiation.

In carrying out the method by known procedures, the radiation used for absorption is obtained, generally, by exciting a vapor of the same element as that to be determined in a gaseous discharge tube, or a hollow cathode discharge. This radiation is concentrated by optical elements into a well-defined beam, which beam is passed through a vapor of the sample to be analyzed. This vapor may be produced by any convenient means, generally being formed by injecting the sample into a flame. In order to recover the desired radiation from the flame, and to separate it from unwanted radiations, the transmitted beam is passed into a dispersing element, usually a spectrometer, and a detector is so located within the optical path of the spectrometer as to receive the radiation of the desired frequency. This method has the disadvantage that it can be carried out with only a single element at any given time.

A principal object of the invention is to provide an instrument capable of determining the presence of two or more elements simultaneously in an analytical sample by atomic absorption spectrometry.

A further object of the invention is to provide a more compact instrument capable of determining the presence of elements in an analytical sample by absorption spectrometry.

These and further objects of the invention will appear as the specification progresses.

In accordance with the invention, radiations of two or more desired frequencies are combined into a single beam, which beam is passed through a vaporized sample containing two or more elements to be determined, after which the beam is decomposed into its constituent frequencies each of which is directed to a corresponding detector, two or more elements being thus simultaneously detected.

The apparatus for accomplishing this technique requires two radiation sources each of the desired frequency, a dispersing element in the form of a prism or grating which receives radiation from both sources, preferably through slits to narrow the beams. The dispersing element must be so disposed that the beams of the respective sources are combined into a common beam which is allowed to pass through the vapor sample. After passage through the sample, the common beam is allowed to impinge upon a further dispersing element which splits the beam into its constituent elements, each of which impinges upon its respective detector.

In a preferred embodiment of the invention, the required length of the apparatus is minimized by allowing the combined beam to emerge from the dispersing element, to pass through the sample vapor, and then to be reflected back through the sample vapor and again into a dispersing system contained within the same enclosure as the system used for forming the combined beam. By a slight inclination of the reflector with respect to the emerging beam, the returning beam is separated from the oncoming beam and brought to a dispersing element differently located from that used for combining the beam. The separated radiations are thus made to return to points different from their origin.

Furthermore, by placing a suitably apertured rotating mirror between the sample and the dispersion system, the detectors may be made to alternately receive illumination which has, and which has not, traversed the sample. Thus, alternating signals representing the incident and transmitted, radiations are detected and measured.

The invention will be described with reference to the accompanying drawing in which the sole figure shows diagrammatically a multi-channel absorption spectrometer according to the invention.

Referring to the drawing, radiations produced by hollow cathode tubes 1 and 2 each producing radiation whose frequency corresponds to one of the elements in an analytical sample contained in a chamber 25 and vaporized by a flame are focused by lenses 3, 4 at slits 5, 6 of a mask 7 located in the focal of the lenses. After passing through slits 5, 6, beams 8, 9 of radiations produced by hollow cathode tubes 1 and 2 impinge upon a first portion 10a of a dispersing element 10 where they are combined into a single beam 11. This dispersing element 10 may be either a prism, or a diffraction grating and is so disposed that incident beams 8, 9 are effectively combined into a single beam 11 containing the two radiations produced by hollow cathode lamps 1, 2. After passing through a slit 12, the combined beam 11 passes through an apertured mirror 13 rotated by a motor 23 so that it alternately traverses the analytical sample in chamber 25, where each of the elements absorbs each of the radiations in the beam in accordance with the aforesaid absorption equation, or is reflected by mirror 13.

After traversing the sample, the beam is reflected by a mirror 14 so that it traverses the analytical sample a second time, and then passes through the aperture in mirror 13 and slit 12. The reflected beam 24 containing both radiations of tubes 1, 2, attenuated by their passage through the analytical sample impinges on a second portion 10b of the dispersing element in such manner that the combined reflected beam is split into two component beams 15 and 16 which pass through slits 17, 18 in mask 7 which are displaced from slits 5, 6 through which radiations from tubes 1, 2 originally passed. After passing through slits 17, 18, the reflected beams are further reflected by mirrors 19, 20 to detectors 21, 22, each responsive to the radiation partially absorbed by one of the elements in the analytical sample.

Although the invention has been described in connection with an embodiment in which the radiation, after traversing the specimen, is reflected back onto a common dispersing element, two such elements may, if desired, be used, each disposed either to combine beams or split the beam into constituent beams. Likewise, instead of reflecting the beam after traversing the specimen, a dispersing element could be located after the analytical specimen which would split the beam into components.

What is claimed is:

1. A method of simultaneously determining the presence of a plurality of elements in an analytical sample which is in a vapor state comprising the steps of producing a plurality of beams of radiation of different wavelengths each corresponding to an absorption line of one of said elements, directing said beams of radiation along converging paths onto a first dispersing element to combine said beams into a common beam, passing said common beam through the analytical sample while in a vapor state whereby each element in the sample absorbs a portion of the corresponding radiation in the common beam, directing the common beam after it has passed through the analytical sample onto a second dispersing element to split said common beam into separate diverging beams of radiation each corresponding to an absorption line of one of said elements in the sample, separately detecting each of said latter beams of radiation to determine the presence of each of said elements in the analytical sample, and comparing the latter beams of radiations with corresponding beams of radiation which have not traversed the sample.

2. Apparatus for simultaneously determining the presence of a plurality of elements in an analytical sample while in a vapor state comprising means to generate a plurality of separate beams of radiation of different wavelengths each corresponding to an absorption line of one of said elements in the analytical sample, a sample chamber containing said analytical sample, means for directing said beams along converging paths, a dispersing element positioned to receive and combine the separate beams of radiation into a common beam of radiation for traversing the sample chamber, means to alternately return the common beam onto said dispersing element before and after traversing the sample to thereby separate said common beam into separate diverging beams of radiation each of which corresponds to an absorption line of one of said elements in said sample, and means to detect each of said separate beams of radiation both before and after traversing the sample.

3. Apparatus for simultaneously determining the presence of a plurality of elements in an analytical sample in a vapor state as claimed in claim 2, in which said means to return includes a rotatable mirror having an aperture therein for the passage of the common beam interposed between the dispersing element and the sample chamber whereby a common beam which has not traversed the sample is alternately reflected with a common beam which has traversed the sample.

4. Apparatus for simultaneously determining the presence of a plurality of elements in an analytical specimen in a vapor state as claimed in claim 2, in which the dispersing element is a prism.

5. Apparatus for simultaneously determining the presence of a plurality of elements in an analytical specimen in a vapor state as claimed in claim 2, in which the dispersing element is a diffraction grating.

References Cited
UNITED STATES PATENTS

| | | |
|---|---|---|
| 2,740,319 | 4/1956 | Svensson. |
| 2,847,899 | 8/1958 | Walsh. |
| 3,137,758 | 6/1964 | Mason et al. |
| 3,386,331 | 6/1968 | Keller. |

RONALD L. WIBERT, Primary Examiner

F. L. EVANS, Assistant Examiner

U.S. Cl. X.R.

350—162, 286; 356—95, 205

PO-1050
(5/69)

UNITED STATES PATENT OFFICE
CERTIFICATE OF CORRECTION

Patent No. 3472594      Dated October 14, 1969

Inventor(s) RAY C. HUGHES, and RADU MAVRODINEANU

It is certified that error appears in the above-identified patent and that said Letters Patent are hereby corrected as shown below:

Column 1, line 43, " $I = I_0 e - kcl$ " should read -- $I = I_0 e^{-kcl}$ --

Signed and sealed this 29th day of September, 1970

(SEAL)
Attest:

Edward M. Fletcher, Jr.
Attesting Officer

WILLIAM E. SCHUYLER, JR.
Commissioner of Patents